United States Patent [19]

Miller

[11] Patent Number: 5,288,990
[45] Date of Patent: Feb. 22, 1994

[54] DIFFERENTIAL SELF-ELECTROOPTIC EFFECT DEVICE

[75] Inventor: David A. B. Miller, Fair Haven, N.J.

[73] Assignee: AT&T Bell Laboratories, Murray Hill, N.J.

[21] Appl. No.: 997,414

[22] Filed: Dec. 28, 1992

[51] Int. Cl.[5] ............................................. H01J 40/14
[52] U.S. Cl. ............................. 250/214 LS; 377/102
[58] Field of Search ........... 250/208.1, 214.1, 214 LS; 377/102; 257/21, 23

[56] References Cited

U.S. PATENT DOCUMENTS

| | | | |
|---|---|---|---|
| 4,546,244 | 10/1985 | Miller | 250/211 |
| 4,751,378 | 6/1988 | Hinton et al. | 250/211 |
| 4,754,132 | 6/1988 | Hinton et al. | 250/211 |
| 5,093,565 | 3/1992 | Lentine | 250/214 LS |

OTHER PUBLICATIONS

Miller, D. A. B., "Quantum-Well Self-Electro-Optic Effect Devices", *Optical & Quantum Electronics*, vol. 22, 1990, pp. S61-S98.
Trabka, E. A. et al., "Image Transformations for Pattern Recognition Using Incoherent . . . ", *Jrnl Optical Society Amer.*, vol. 54, No. 10, Oct. 1964, pp. 1242-1252.

*Primary Examiner*—David C. Nelms
*Attorney, Agent, or Firm*—Gerard A. deBlasi

[57] ABSTRACT

Optical analog information processing capability is achieved by providing a SEED device configured to operate in a differential mode This "differential SEED" utilizes pairs of input signal beams to represent bipolar analog data and to process those data in a linear fashion. The difference in the optical powers of the input signal beams is used to modulate the absorption of power supply beams in quantum well diodes, such that the difference in the absorbed powers in the quantum well diodes is proportional to the difference in the powers of the input signal beams. The differential SEED can be configured to perform various image processing operations on bipolar analog data, including, for example, image addition and subtraction, optical multiplication, and evaluating spatial derivatives.

18 Claims, 9 Drawing Sheets

DIFFERENTIAL SELF-ELECTROOPTIC EFFECT DEVICE

TECHNICAL FIELD

This invention relates to optical information processing devices and, more particularly, to optical information processing devices which utilize the self-electrooptic effect.

BACKGROUND OF THE INVENTION

The use of optics and optical devices in fields such as communications and computing has created a need for optical devices capable of performing information processing operations. This need extends to both digital and analog information processing operations.

The advent of symmetric self-electrooptic effect devices (SEEDs) has partially satisfied the need for optical information processing devices by enabling development of devices suitable for performing digital logic operations. Typical optical digital logic devices are switched based on the intensity of a pair of input signal beams, the ratio or difference of the intensities of the two beams representing an input data value. The first beam of the pair being more intense than the second represents a logic 0 value and the second beam being more intense than the first represents a logic 1 value. The intensities of the signal beams are selected to have sufficient contrast between a logic 0 value and a logic 1 value to ensure proper operation of the symmetric SEED and correct representation of the data.

The need for optical analog information processing devices, however, is largely unsatisfied. While an analog value is simplest to represent as a single light beam with a predetermined intensity, this representation causes problems in practical devices. One particularly troublesome problem is the difficulty in representing both positive and negative (bipolar) data values. This problem arises because the intensity of a light beam used to represent an analog datum can only be zero or positive; the light beam cannot have a negative intensity.

SUMMARY OF THE INVENTION

Optical analog information processing capability is achieved by providing a SEED device configured to operate in a differential mode (a "differential SEED"). The differential SEED uses differential pairs of light beams to represent both positive and negative analog data values. The differential SEED receives information, typically in the form of one or more input optical signals, and processes the information in a predetermined manner to generate an electrical current. The electrical current controls the absorption properties of quantum well diodes to modulate power supply beams, such that the difference in the absorbed powers in the quantum well diodes is proportional to the electrical current. The differential SEED can be configured to perform various image processing operations on bipolar analog data, including, for example, image addition and substraction, optical multiplication, and evaluating spatial derivatives of an image.

In an exemplary embodiment of the invention, the differential SEED includes a pair of conventional p-i-n photodiodes that generate a photocurrent in response to one or more pairs of input signal beams. The photocurrent from the photodiodes controls the absorption properties of two quantum well diodes which absorb light from power supply beams in an amount proportional to that photocurrent. Configured in this manner, the differential SEED performs image addition by adding the pixels of a first image to respective pixels of a second image. Light from the first and second images is directed onto different ones of the conventional photodiodes, causing the photodiodes to generate a photocurrent representing the sum of the first and second images. The photocurrent modulates the absorption of the quantum well diodes so that the light beams output from the quantum well diodes represent the sum of the first and second images.

DETAILED DESCRIPTION

To establish a foundation for the teachings of my invention, a brief review of the structure and operation of self-electrooptic effect devices (SEEDs) will be presented prior to describing the details of the invention.

Quantum well SEEDs are a family of optoelectronic devices that operate based on the large electroabsorptive mechanisms seen in layered semiconductor structures. These devices are described in detail, for example, in U.S. Pat. Nos. 4,546,244, 4,751,378, and 4,754,132. A conventional SEED includes a GaAs/AlGaAs p-i-n photodiode having one or more quantum well layers in the intrinsic (i) region of the photodiode (hereafter referred to as a quantum well diode). The quantum well diode is coupled to a current source which reverse biases the diode. In practice, quantum well diodes are constructed such that, over a range of reverse bias, exactly one electron of photocurrent flows for each photon absorbed in the intrinsic region of the diode.

The amount of optical power absorbed by a quantum well diode, and thus the amount of photocurrent generated by the diode, depends on the voltage across the diode. (The photon energy of the light beam is chosen such that the diode absorption and photocurrent increase with increasing voltage.) The photocurrent, in turn, will change the voltage across the quantum well diode according to the external circuit through which the photocurrent passes. When the external circuit has the characteristic that the current through it is substantially independent of the voltage across it (a so-called "constant current source"), this creates a feedback mechanism referred to as "self-linearized modulation."

In self-linearized modulation, the voltage across the quantum well diode adjusts itself so that the generated photocurrent is exactly equal to the current from the current source. If the diode is generating too much photocurrent, there would be a net current that would act to discharge the capacitance of the quantum well diode, decreasing the voltage across the diode and thus reducing the absorption of the diode. Conversely, if the quantum well diode is generating too little photocurrent, the voltage across the diode increases, causing absorption to increase. Consequently, in the steady state, the power $P_A$ absorbed by the quantum well diode is linearly proportional to the current $I_C$ flowing through the diode, according to the expression.

$$P_A = \frac{\hbar\omega}{e} I_c$$

where $\hbar\omega$ is the photon energy and e is the electronic charge. Self-linearized modulation is described in U.S. Pat. No. 4,546,244, which is hereby incorporated by reference.

I have recognized that the concept of self-linearized modulation in SEEDs can be applied to a differential operating mode to control pairs of light beams. SEEDs operating in this novel differential mode (which are referred to herein as "differential SEEDs") can linearly process bipolar analog values represented by the dual beams. This enables various information processing operations to be performed which could not be performed by the prior art, such as evaluating spatial derivatives of an image. Several such illustrative information processing operations are described below, following a description of exemplary differential SEED architectures.

Figure 1:
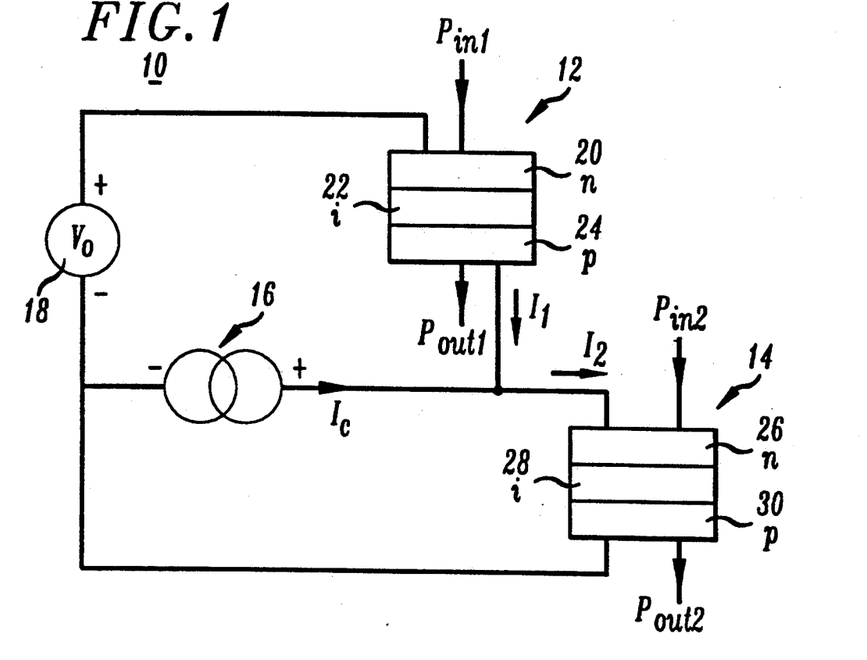
FIG. 1 is a schematic diagram of a differential SEED constructed in accordance with the principles of the invention.

FIG. 1 shows an exemplary differential SEED 10 constructed in accordance with the principles of the present invention. Differential SEED 10 includes two quantum well diodes 12 and 14, a current source 16, and a voltage supply 18. Quantum well diodes 12 and 14 are p-i-n diodes having multiple quantum wells in the intrinsic region. Diodes 12 and 14 generate one electron of current for each photon that the diode absorbs. The n, i, and p regions of diodes 12 and 14 are respectively indicated by reference numbers 20, 22, and 24, and 26, 28, and 30. Current source 16, which could be either an electrical source or an optical source (e.g., a photodiode), provides a control current $I_C$ to a node 19 formed between quantum well diodes 12 and 14.

The difference between the optical powers absorbed by quantum well diodes 12 and 14 is linearly proportional to the current $I_C$ flowing into node 19. More specifically, the difference between the absorbed powers $P_{A1}$ and $P_{A2}$ of quantum well diodes 12 and 14, respectively, is given by $$P_{A2} - P_{A1} = \frac{\hbar\omega}{e} I_c$$

In a typical application, $I_C$ is determined by the difference in the optical power of two or more beams of light.

As described below, this property can be used advantageously to linearly process analog data.

Figure 2:
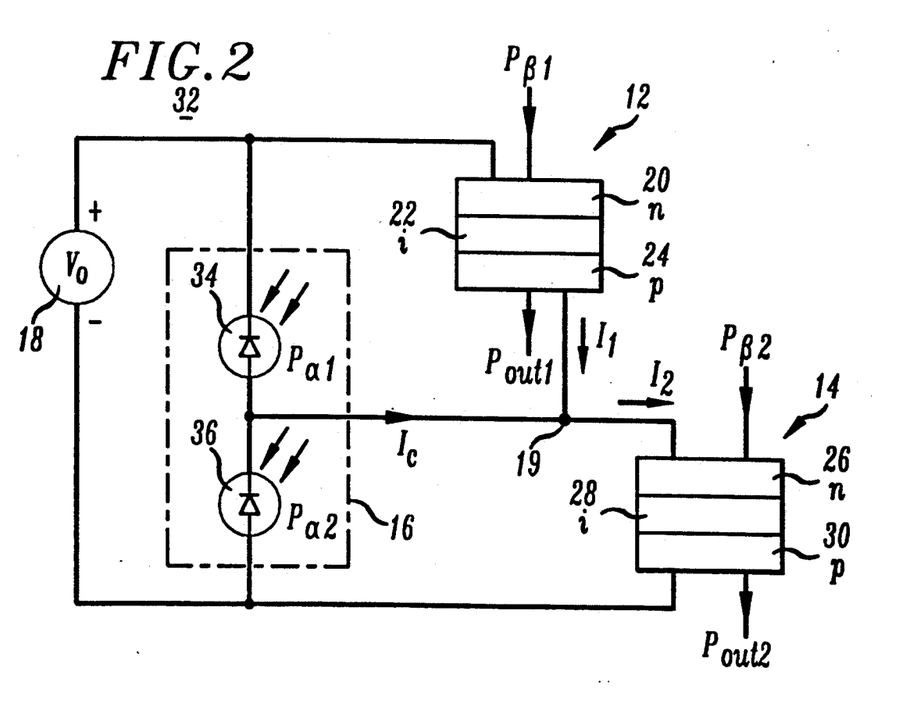
FIG. 2 is a schematic diagram of an exemplary embodiment of the differential SEED of FIG. 1 wherein the current supply source is optical.

FIG. 2 shows an exemplary differential SEED 32 in which current source 16 is embodied as a pair of conventional (i.e., non-quantum well) p-i-n photodiodes 34 and 36. As used herein, a "conventional" photodiode is a photodiode that, over a usable range of reverse bias voltage, passes substantially one electron of current for every photon incident on the diode. Such conventional photodiode operation can be obtained, for example, from readily available silicon photodiodes.

Photodiodes 34 and 36 receive a respective one of a pair of optical input beams, the relative powers of which determine the value and sign of an input analog datum. The optical powers absorbed by photodiodes 34 and 36 determine the magnitude and direction of control current $I_C$ and, therefore, determine the difference in the power absorbed by quantum well diodes 12 and 14 and the value of the differential signals output from diodes 12 and 14. Specifically, when the intensity of a light beam incident on photodiode 34 is greater than the intensity of a light beam incident on photodiode 36, diode 34 generates more photocurrent than diode 36, and $I_C$ flows into node 19. To satisfy Kirchhoff's Law, or, equivalently, conservation of current, $I_2$ will exceed $I_1$. As described below, this causes quantum well diode 14 to absorb more optical power than quantum well diode 12. Conversely, when the intensity of the beam incident on photodiode 36 is greater than the intensity of the beam incident on photodiode 34, diode 36 will generate more photocurrent than diode 34, and $I_C$ will flow out of node 19 (or, equivalently, $I_C$ will have a negative value). This will cause quantum well diode 12 to absorb more optical power than quantum well diode 14.

Figure 3:
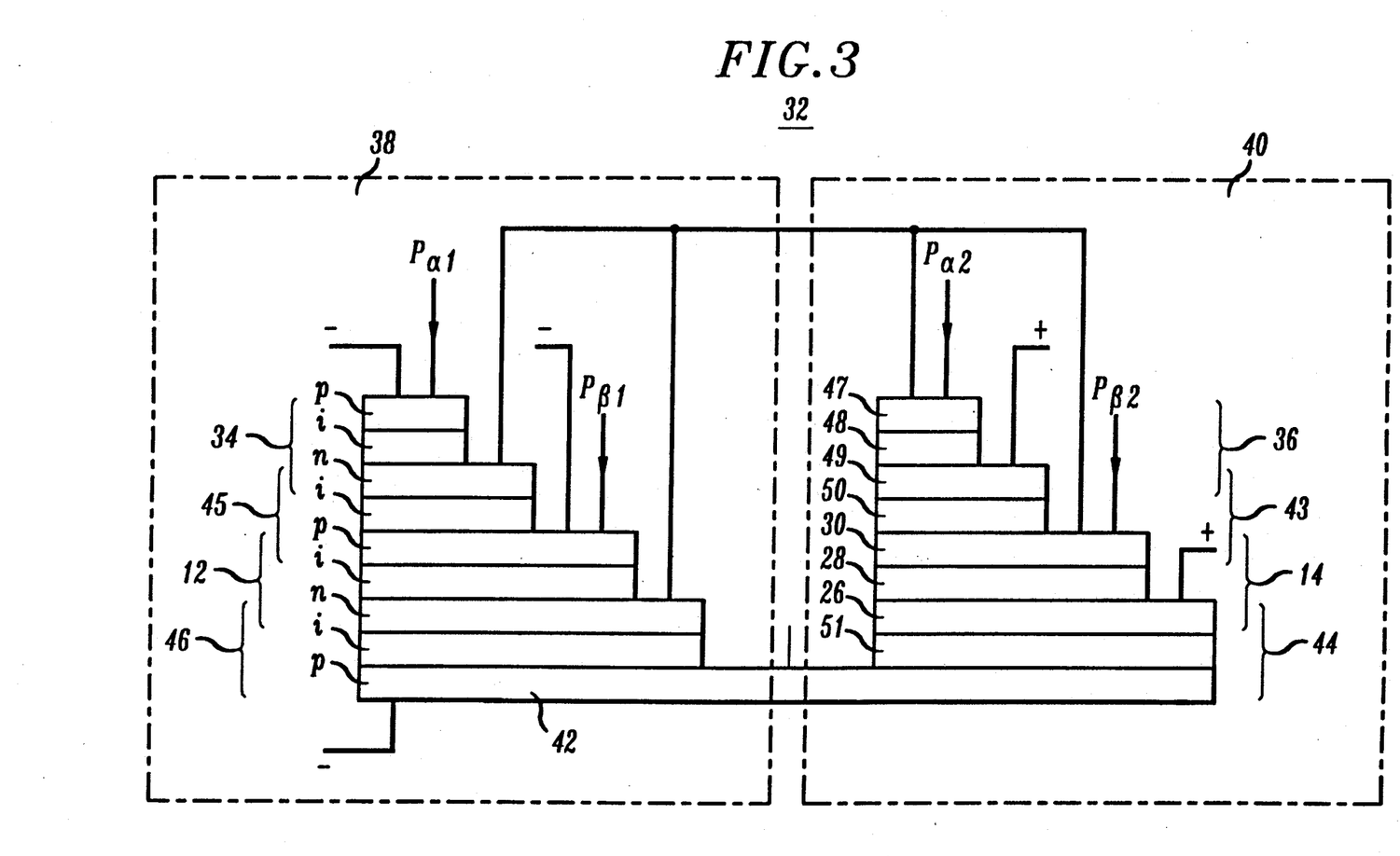
FIG. 3 is a simplified cross-sectional view of the differential SEED of FIG. 2.

FIG. 3 shows an illustrative layer structure for differential seed 32 of FIG. 2. The layer structure includes two symmetrical sections 38 and 40 that are physically connected through a common layer 42. Section 40 includes four diodes, namely, photodiode 36, quantum well diode 14, and isolating diodes 43 and 44. As previously discussed, photodiode 36 (layers 47, 48, and 49) and quantum well diode 14 (layers 26, 28, and 30) are respectively conventional and quantum well p-i-n diodes. Diode 43 (layers 49, 50, and 30) is reverse-biased to electrically isolate photodiode 36 from quantum well diode 14. Similarly, diode 44 (layers 26, 51, and 42) is reverse-biased to electrically isolate quantum well diode 14 from quantum well diode 12. It will be understood that the foregoing discussion of section 40 is equally applicable to section 38, in that diodes 36, 14, 43, and 44 are constructed and operate in the same manner as diodes 34, 12, 45, and 46, respectively.

Figure 4:
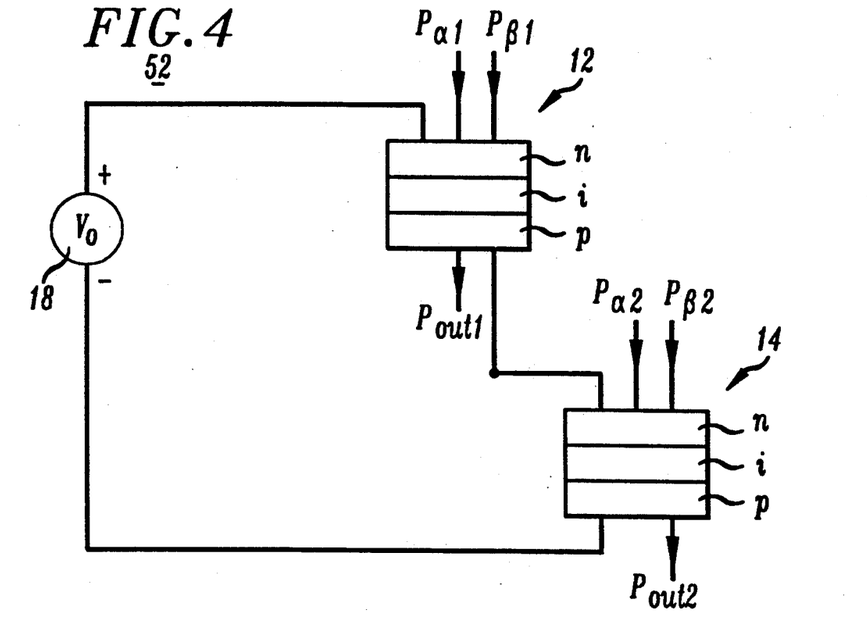
FIGS. 4, 5 and 6 are schematic diagrams of alternative embodiments of differential SEEDs constructed in accordance with the principles of the invention.

FIG. 4 shows an alternative embodiment of a differential SEED 52 which is constructed using only quantum well diodes, thereby allowing the device to be fabricated using conventional symmetric SEED fabrication processing. Quantum well diodes 12 and 14 of differential SEED 52 function not only as quantum well modulators, but also perform the function of conventional photodiodes 34 and 36 (current source 16) of FIG. 2. In particular, diodes 12 and 14 receive power supply light beams $P_{\beta 1}$ and $P_{\beta 2}$, as well as input signal beams $P_{\alpha 1}$ and $P_{\alpha 2}$. When the input signal light beams are at a short wavelength, the absorption of the quantum well material is only highly dependent on voltage near to the optical absorption edge or bandgap wavelength. Hence, at these shorter wavelengths, the quantum well diode can behave as a conventional photodiode. In this manner, quantum well diodes 12 and 14 can themselves serve as the current source for controlling the absorption within those diodes. This "self-controlling" scheme can be used, for example, with visible light input signal beams $P_{\alpha 1}$ and $P_{\alpha 2}$, and the appropriate operating wavelength near the bandgap for beams $P_{\beta 1}$ and $P_{\beta 2}$, Such a scheme is useful when the input signal light beams ($P_{\alpha 1}$ and $P_{\alpha 2}$) are of a short wavelength, or for small signal operation where the voltage across the diodes changes relatively little. Suitable SEED fabrication techniques are described in L.M.F. Chirovsky et al., "Batch-Fabricated Symmetric Self-Electro-Optic Effect Devices," OSA Proceedings On Photonic Switching, Vol. 3, 1989, pp. 2-6, which is hereby incorporated by reference.

One skilled in the art will appreciate that differential SEED 52 could be constructed using four quantum well diodes rather than just two such diodes. Two of the four quantum well diodes would receive a respective input signal beam (e.g., $P_{\alpha 1}$ and $P_{\alpha 2}$) and function as a current source, while the other two quantum well diodes would receive power supply beams ($P_{\beta 1}$ and $P_{\beta 2}$) and function as modulators driven by the current source. In this case, the two quantum well diodes functioning as the current source are biased to a higher voltage, at which the responsivity of the diodes at the near bandgap operating wavelength is not highly dependent on voltage.

The differential SEED architectures described thus far are suitable for processing so-called "double-ended" images, that is, images in which the analog value associated with an element of the image (sometimes referred to as a "picture element" or "pixel") is represented by the relative intensities of a pair of light beams. However, the differential SEEDs of the present invention also can process so-called "single-ended" images, that is, images in which the analog value associated with a pixel is represented by the intensity of a single light beam. Normal visual images are therefore usually "single-ended" in this classification. Architectures used to process single-ended images are useful, for example, as the first stage of a processor for evaluating spatial derivatives of a single, unpixelated image. Note that, although the input image can be represented in single-ended form, the spatial derivative in general cannot, because such a derivative can assume either positive or negative values. Such bipolar values can be represented by a pair of light beams, i.e., a "double-ended" representation. Exemplary differential SEED architectures for processing single-ended images are shown in FIGS. 5 and 6.

Figure 5:
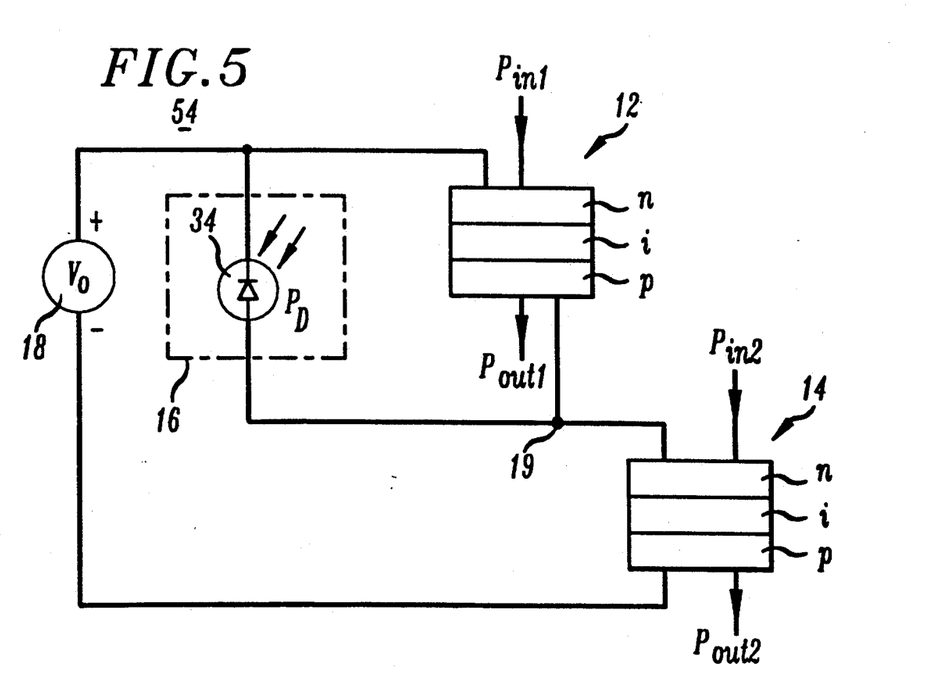

FIG. 5 shows a differential SEED 54 configured to convert single-ended optical signals into differential optical outputs (or, equivalently, into a "double-ended" representation). Differential SEED 54 includes quantum well diodes 12 and 14 which modulate the absorbed optical power of beams $P_{in1}$ and $P_{in2}$ on the basis of the current supplied to node 19 by current source 16, which is embodied as a single photodiode 34. Single-ended input signals strike photodiode 34, causing photodiode 34 to generate a photocurrent that drives quantum well diodes 12 and 14. In this manner, the single-ended input signals are converted to double-ended signals suitable for further processing by subsequent stages of differential SEEDs.

Figure 6:
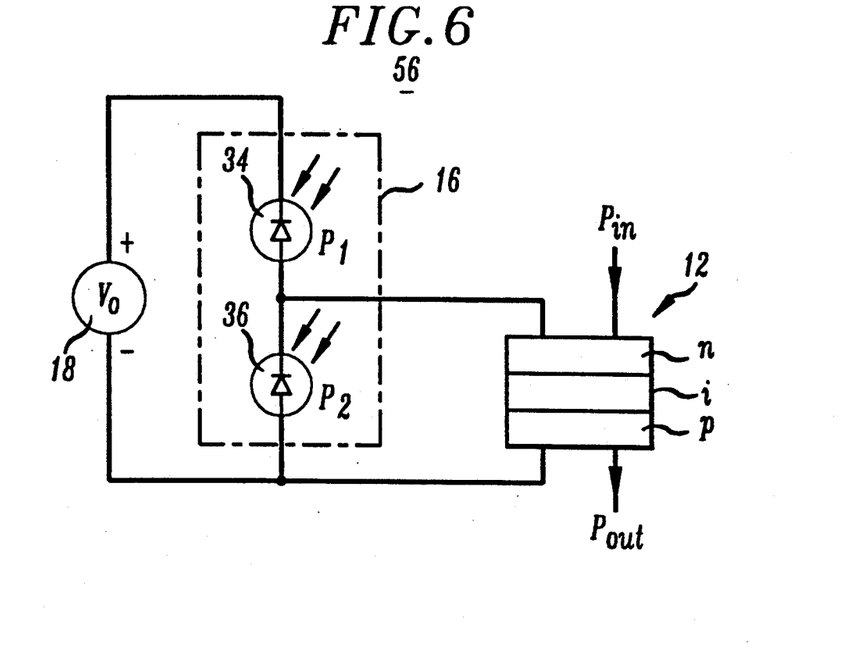

FIG. 6 shows a differential SEED 56 which utilizes the self-linearized behavior of quantum well diode 12 to convert differential (double-ended) optical signals into single-ended optical outputs. Differential SEED 56 includes two photodiodes 34 and 36 which respectively receive double-ended signals $P_1$ and $P_2$. Photodiodes 34 and 36 generate a photocurrent that passes through quantum well diode 12, causing quantum well diode 12 to modulate power supply beam $P_{in}$. In this manner, differential bipolar input signals are converted to a positive image. It is to be understood that this conversion will, in general, only operate correctly when the bipolar signal has one particular sign; this can always be arranged by adding an appropriate constant to the signal at an earlier processing stage.

Having described exemplary differential SEED architectures and fabrication techniques, I will now describe illustrative applications for these devices.

Figure 7:
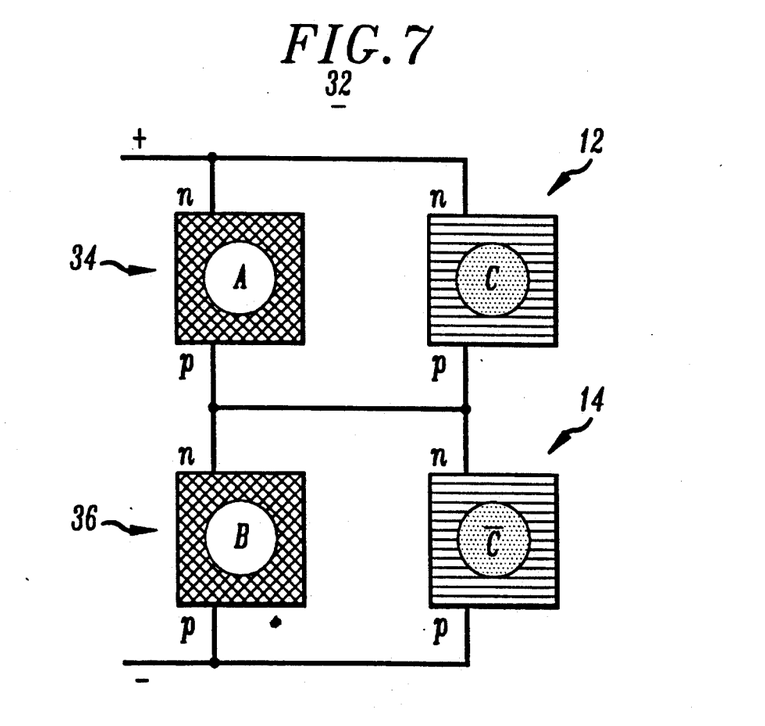
FIG. 7 is a plan view of the differential SEED of FIG. 2.

FIG. 7 shows a plan view of differential SEED 32 of FIG. 2. An array of such devices can be configured to subtract a single-ended image B from a single-ended image A. Power supply beams of substantially equal power strike quantum well diodes 12 and 14. More particularly, differential SEED 32 subtracts a pixel of image B from a pixel of image A, and gives the result as the difference of output powers in the differential pair C and $\overline{C}$. The difference between the output beam powers is proportional to the difference between the powers in the given pixels of input images A and B, regardless of the absolute powers of the input images. The output of differential SEED 32 (i.e., the output powers of the differential pair C and $\overline{C}$) can be directed to a second stage of differential SEEDs for further processing.

Figure 8:
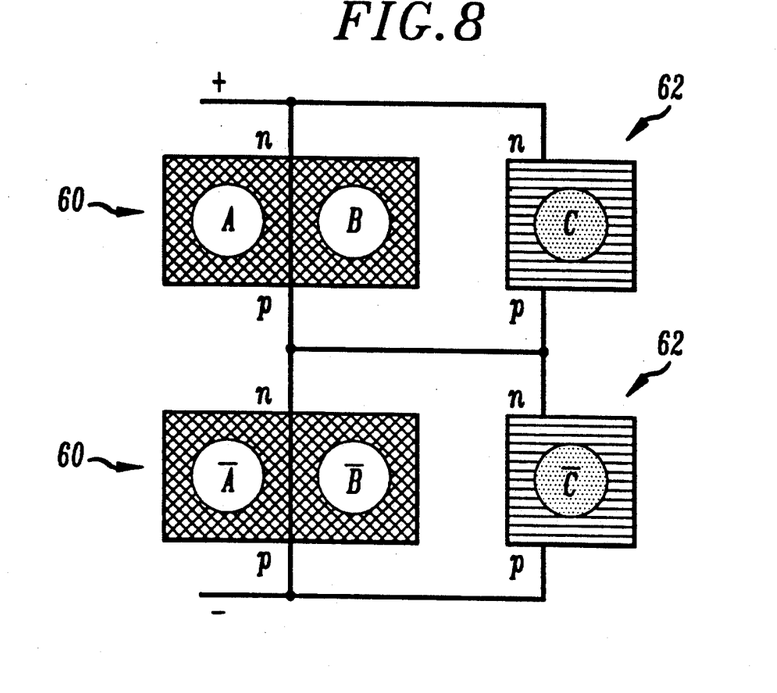
FIGS. 8, 9 and 10 are plan views of differential SEEDs for performing image addition and substraction.
Figure 9:
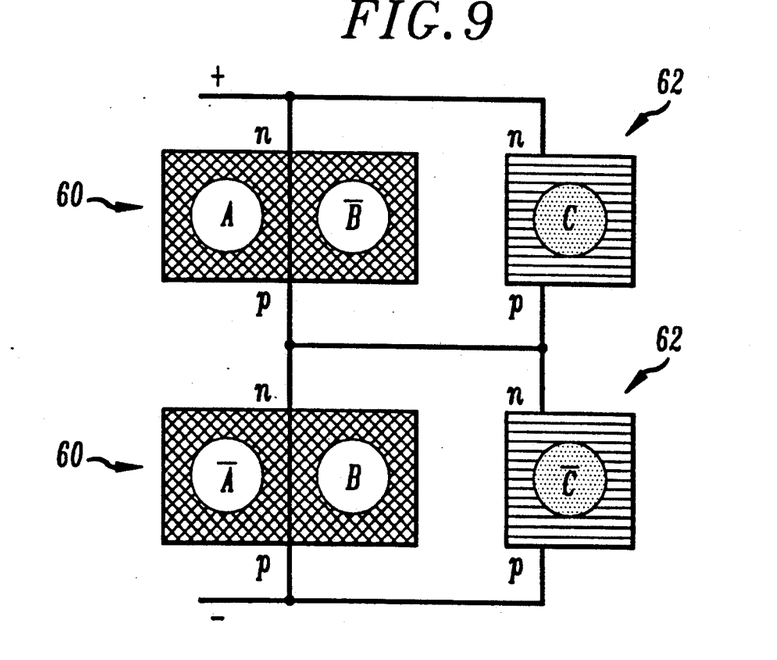
Figure 10:
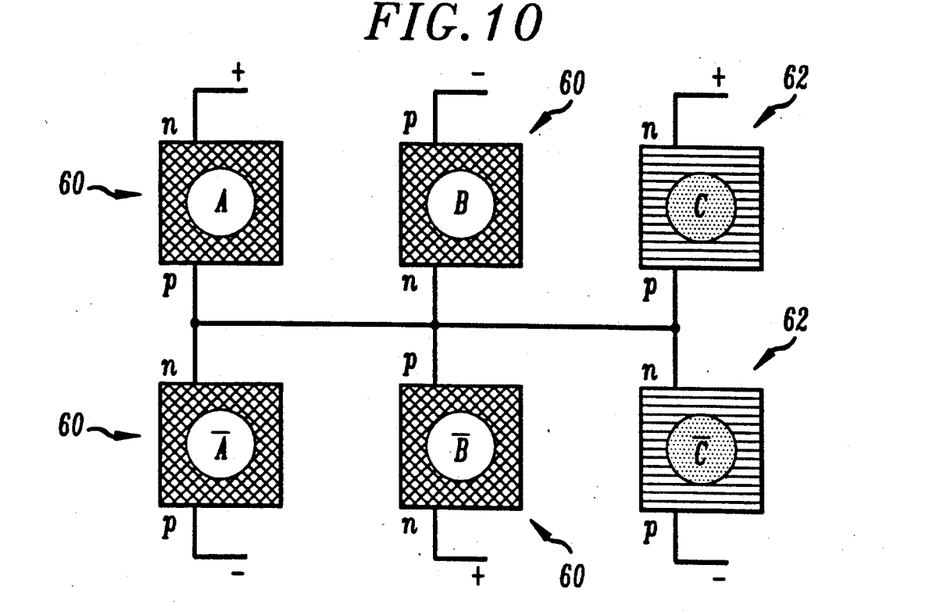

FIGS. 8-10 show exemplary differential SEED arrangements for processing differential input beams. Throughout these figures, A and $\overline{A}$ (and similarly B and $\overline{B}$, and C and $\overline{C}$) are understood to be the pairs of light beams representing an analog value in a "double-ended" form. In each of FIGS. 8-10, differential input signal beams A, $\overline{A}$, B, and $\overline{B}$ strike conventional photodiodes 60. Power supply beams of substantially equal power strike quantum well diodes 62. Quantum well diodes 62 modulate the power supply beams incident thereon, in response to the photocurrent generated by photodiodes 60, to provide differential output beams C and $\overline{C}$.

FIG. 8 shows a differential SEED which adds two differential images, A and B, giving the result in the differential pair of beams C and $\overline{C}$. A pixel of image A and a pixel of image B strike one of photodiodes 60 while pixels of $\overline{A}$ and $\overline{B}$ strike the other of photodiodes 60. Assuming beams A and B are of greater intensity than beams $\overline{A}$ and $\overline{B}$, photocurrent will flow into node 19, resulting in greater absorption of beam $\overline{C}$ by quantum well diodes 62 than of beam C. Beams C and $\overline{C}$ are then supplied as a differential input to another stage of differential SEEDs for further processing, if required.

FIGS. 9 and 10 show illustrative differential SEEDs for subtracting differential images A and B. FIG. 9 shows the same differential SEED as shown in FIG. 8. The subtraction is performed by optically interchanging beams B and $\overline{B}$, and then performing the addition as in FIG. 8. FIG. 10, on the other hand, shows a version of the differential SEED that is rewired to perform the subtraction of the differential images. The differential SEED of FIG. 10, therefore, does not require optically interchanging beams B and $\overline{B}$.

Differential SEEDs constructed in accordance with the principles of the present invention can multiply one beam or set of beams by another beam or set of beams. This functionality can be used, for example, to implement optically controlled weights for an optical neural system, as shown in FIG. 11.

Figure 11:
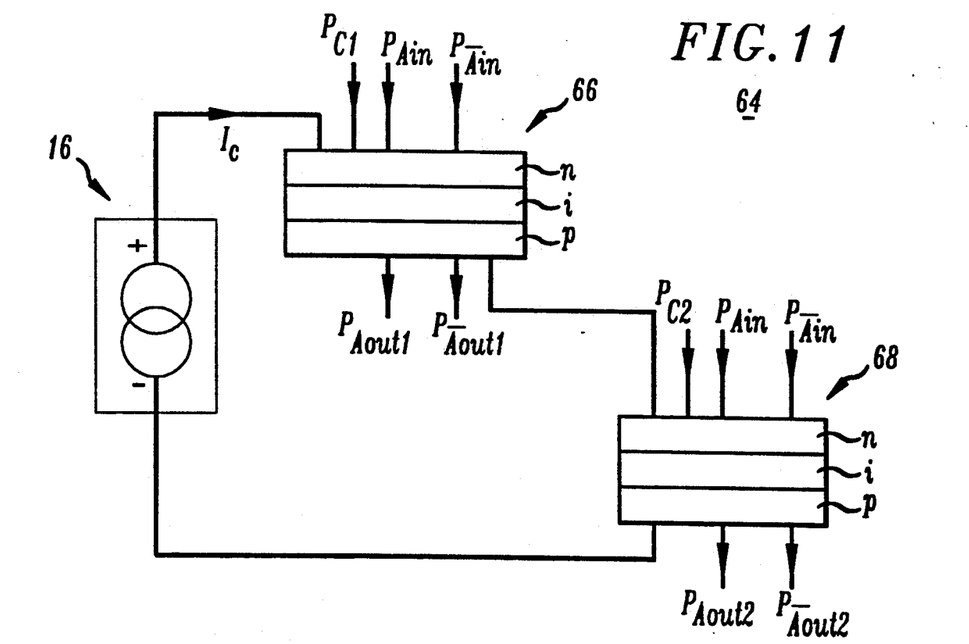
FIG. 11 is a schematic diagram of a differential SEED multiplier circuit constructed in accordance with the principles of the invention.

FIG. 11 shows a differential SEED 64 configured to multiply a differential signal $P_{Ain}$ and $\overline{P}_{Ain}$ by a positive or negative number to vary the weights in an optical neural net. Differential SEED 64 uses four input light beams ($P_{Ain}$, $\overline{P}_{Ain}$, $P_{C1}$, and $P_{C2}$) and thus permits a full bipolar multiplication of the differential signal. Differential SEED 64 includes two quantum well diodes 66 and 68 in series with current source 16. The input differential pair $P_{Ain}$ and $\overline{P}_{Ain}$ are replicated onto both diodes. Two powerful control beams $P_{C1}$ and $P_{C2}$ independently control the absorptions, and thus the transmissions, of their respective diodes. Control beams $P_{C1}$ and $P_{C2}$ control the absorptions because the absorption of each quantum well diode will adjust so that the photocurrent generated in each quantum well diode is proportional to the current $I_C$. If control beams $P_{C1}$ and $P_{C2}$ are much more powerful than the signal beams $P_{Ain}$ and $\overline{P}_{Ain}$, then the control beams dominate over the signal beams in controlling the absorptions of the quantum well diodes.

Diodes 66 and 68 have respective transmissions $T_1$ and $T_2$, where T equals 1 minus the fractional absorption of the diode. The weight for differential SEED 64 is the difference in transmissions $T_1-T_2$. This difference can be either positive or negative. The weight is given by the expression $$T_1 - T_2 = \frac{\hbar\omega}{e} I_c \left[ \frac{1}{P_{C1}} - \frac{1}{P_{C2}} \right],$$

and is controlled by the power of control beams $P_{C1}$ and $P_{C2}$. It is assumed that control beams $P_{C1}$ and $P_{C2}$ are much more powerful than signal beams $P_{Ain}$ and $\overline{P}_{Ain}$. The value of the weight could be controlled by keeping one control beam power fixed and varying the other, although greater dynamic range is possible if both control beams are varied.

Although the differential SEED of FIG. 11 has been described in the context of a multiplier configured to operate on differential inputs, it is within the scope of the invention to construct a multiplier which operates with single-ended representations of an analog signal at the input, as might be represented by beams $P_{Ain}$ without the beams $\overline{P}_{Ain}$.

Figure 12:
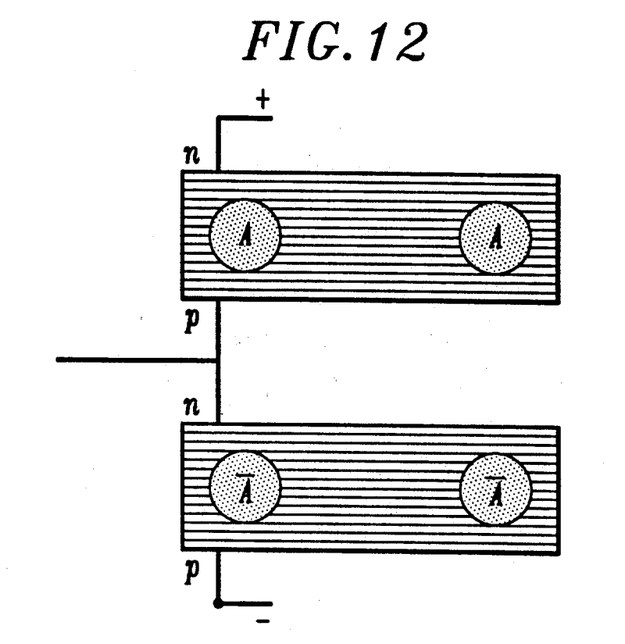
FIGS. 12, 13 and 14 are plan views of successive layers of differential SEEDs for implementing image multiplication.
Figure 13:
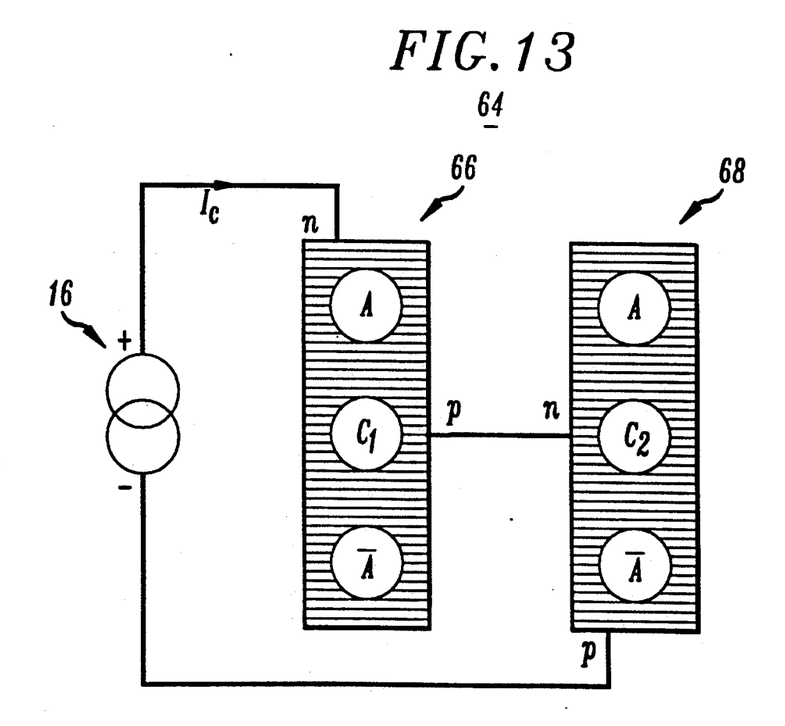
Figure 14:
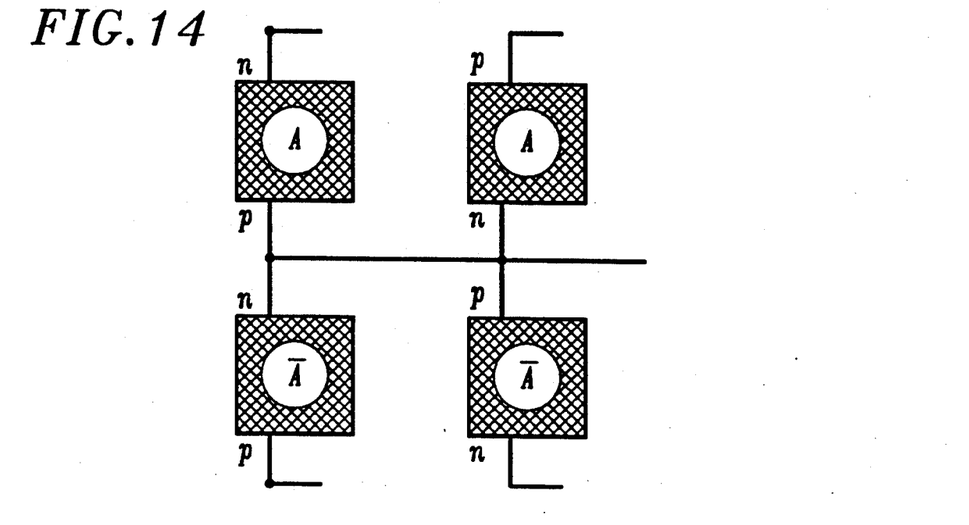

FIGS. 12–14 show plan views of three successive, stacked stages of differential SEEDs, wherein the second stage (FIG. 13) multiplies a differential signal (A and $\overline{A}$) received from a preceding stage (FIG. 12) by a positive or negative number (controlled by $C_1$ and $C_2$). More particularly, FIG. 12 shows the output modulators of a preceding stage of differential SEED devices, in which each modulator modulates two identical power beams, and all four power beams have equal power. FIG. 13, which is the plan view of differential SEED 64 of FIG. 11, shows a multiplier in which the transmissions of quantum well diodes 66 and 68 are set separately by the two control beams $C_1$ and $C_2$ to effect the multiplication. FIG. 14 shows four input detectors for a subsequent processing stage which receives the output signals from differential SEED 64 of FIG. 13. These input detectors output a photocurrent that is proportional to the difference in the two differential inputs; this photocurrent represents the value of the original differential signal as multiplied by the desired number.

The differential SEED arrangements described thus far are most useful in processing pixelated images, that is, images in which the analog value associated with each pixel is represented by the power of a distinct light beam or set of light beams. The differential SEEDs of the present invention, however, also are well suited for processing unpixelated images. Various arrays can be constructed, for example, to evaluate spatial derivatives of an image or to perform a convolution or cross-correlation in real space. The differential output provided by the differential SEEDs of the invention is particularly advantageous in evaluating spatial derivatives, because the spatial derivatives of an image can be either positive or negative.

Figure 15:
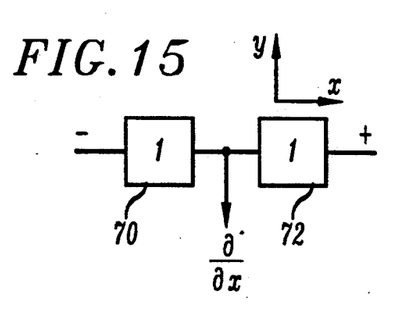
FIGS. 15, 16, 17 and 18 are block diagrams of exemplary input stages (input photodiode layouts) of differential SEEDs for evaluating local derivatives of an image.
Figure 16:
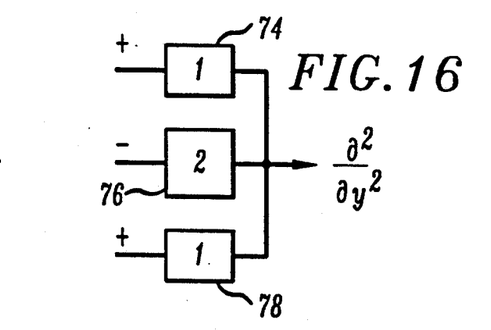
Figure 17:
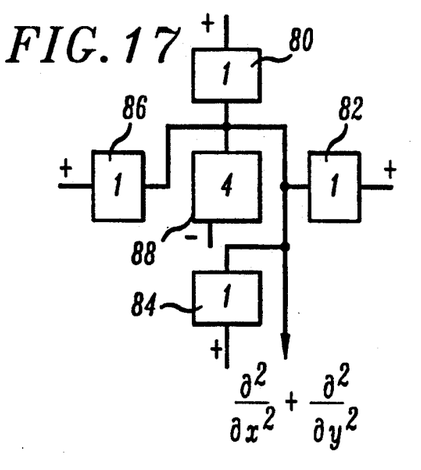

FIGS. 15–17 show exemplary layouts of input photodiodes (i.e., the input stages) of differential SEEDs that evaluate various spatial derivatives of an image. The arrow in each figure indicates the current flowing from the input stage to the output stage (not shown) of the differential SEED. The magnitude of this current is a direct measure of the derivative. The numbers indicated on the photodiodes show the relative photosensitive surface areas of those diodes.

FIG. 15 shows two photodiodes 70 and 72 of equal area spaced apart by a predetermined distance. This arrangement provides a simple measure of the derivative of the intensity in the direction of separation of diodes 70 and 72, which in this case is the x direction. Such first derivative circuits are useful for identifying edges in images.

The arrangement of FIG. 16, which includes diodes 74, 76, and 78, evaluates the second derivative of the intensity in the direction of separation of the diodes, which in this case is the y direction. The second derivative is the difference between two first derivatives separated laterally in space. The arrangement of FIG. 16 can be analyzed by assuming that diode 76 is divided in the middle, with diode 74 and the upper half of diode 76 forming a "first derivative pair" (as in FIG. 15), and diode 78 and the lower half of diode 76 forming another "first derivative pair" that is oppositely connected. The result is a measure of the second derivative.

FIG. 17 shows an arrangement of photodiodes 80, 82, 84, 86, and 88 for evaluating an approximation to the Laplacian. The Laplacian can be used to recognize minima, maxima, and "bumps" in images. The operation of this device can be understood with reference to FIG. 16, in that FIG. 17 adds to FIG. 16 photodiodes for evaluating the second derivative in the x direction. Other embodiments of this Laplacian circuit are possible, such as, for example, a circularly symmetric structure with a center circle and a concentric annular ring, both of equal area. While the circularly symmetric version is a better approximation to the Laplacian, the version shown in FIG. 17 is well suited to a rectangular sampling array as shown in FIG. 19.

Figure 18:
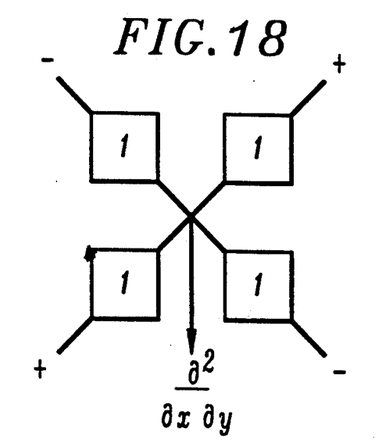

One skilled in the art will appreciate that various other combinations of photodiodes can be constructed to evaluate different spatial derivatives. For example, the arrangement of FIG. 18 evaluates the "cross derivative" of an image. The cross derivative recognizes saddle points and corners with particular orientations.

Increasing the separation of the diodes in FIGS. 15–18 increases the value of the measured derivative. One technique for greatly separating the input diodes of a differential SEED is to interleave them with the input diodes of neighboring SEEDs in an array, as shown in FIG. 19 for the Laplacian circuit of FIG. 17. In FIG. 19, the input image is shined onto the entire array, for example, through a mask with circular holes 90 corresponding the sampling circles. The differential outputs $O_{ij}$ are taken from the output diodes 92. The input diodes of adjacent sampling circles are electrically connected as shown (other electrical connections are omitted for clarity). The variation of the image intensity within one circle of FIG. 19 is presumed to be much less than the variation between circles. The layout evaluates derivatives through finite differences between the values at equally spaced sampling points.

Figure 19:
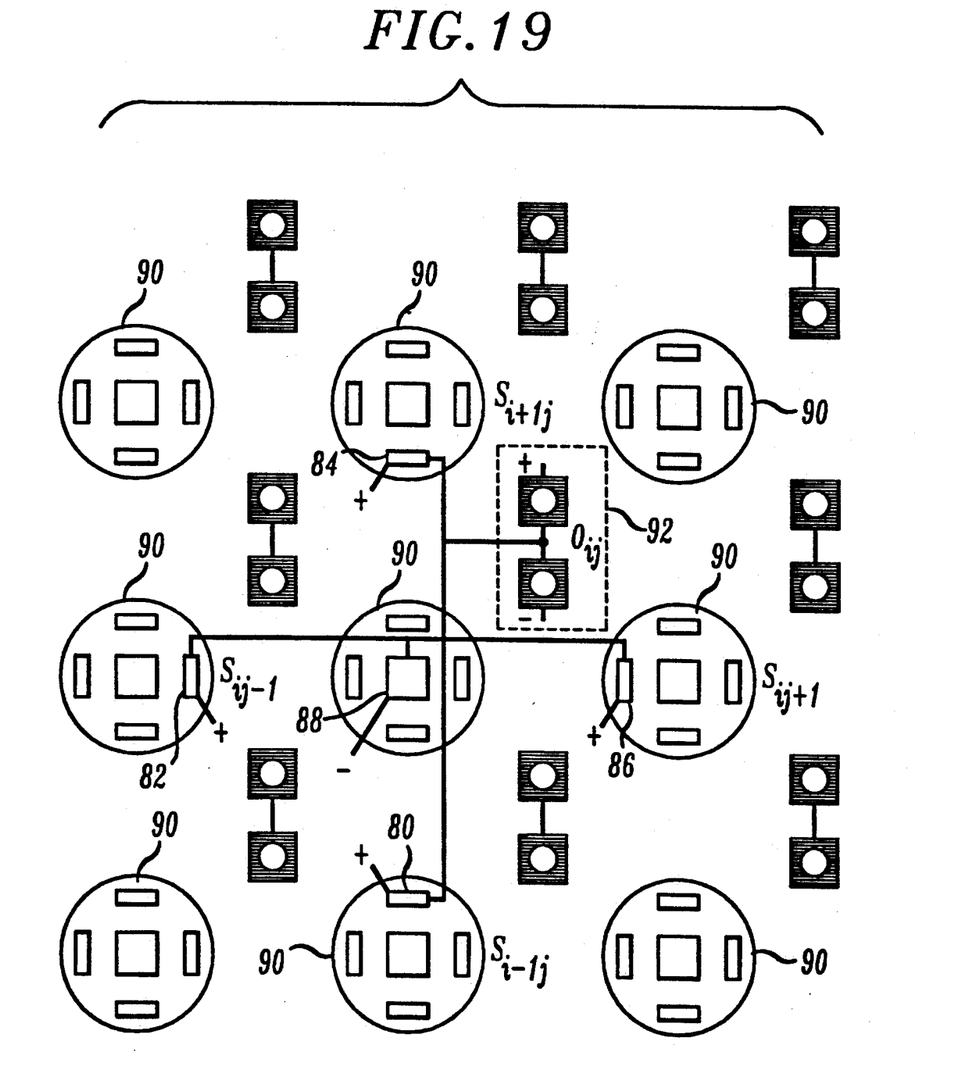
FIG. 19 is a simplified, partial plan view of an array of the differential SEEDs of FIG. 17.

The evaluation performed by the array of FIG. 19 can be used to perform a convolution or a cross-correlation in real space, with a fixed kernel. The function performed by a circuit such as that of FIG. 19 can be written as $$O_{ij} = \sum_{k,l} w_{kl} S_{i+kj+l}$$

where the weights $W_{kl}$ are the areas of the photodiodes, and $S_{ij}$ is the intensity in a given sampling circle 90. For the specific Laplacian example of FIG. 19, the relative sizes of the weights are $$w_{kl} = \begin{cases} +1, & k = 0 \quad l = \pm 1 \\ -4, & k = l = 0 \\ +1, & k = \pm 1 \quad l = 0 \end{cases},$$

and zero otherwise. These weights are determined by the relative photosensitive surface areas of the photodiodes within a sampling circle 90.

The process described by the equation above is a convolution of the sampled image $S_{ij}$ with the kernel $W_{kl}$. $O_{ij}$ is the convolution of $S_{ij}$ with the kernel $W_{-k-l}$, and $O_{-i-j}$ is the cross-correlation of $W_{kl}$ with $S_{ij}$. Other kernels of other weights could also be constructed and could extend over more cells. The weights would still be set by the areas of the photodiodes within each sampling area. The intensity within each sampling circle should not vary much within the circle for the process to correspond accurately to a convolution or cross-correlation.

It will be apparent to one skilled in the art that other modifications can be made to the described embodiment without departing from the scope of the invention. For example, the differential SEEDs of the invention could be configured to receive simultaneously three or more differential input signal beams to simultaneously add three images.

I claim:

1. Semiconductor apparatus comprising:
   first and second quantum well diodes electrically coupled to each other, the first and second quantum well diodes each having an optical input for receiving first and second light beams, respectively, the first and second quantum well diodes absorbing optical energy from the first and second light beams in an amount proportional to an electrical current flowing through the respective quantum well diode; and
   means for inducing differential electrical currents within the first and second quantum well diodes.

2. The invention of claim 1 wherein the first and second quantum well diodes each absorb one photon for each electron of current that flows through the respective diode.

3. The invention of claim 1 wherein the inducing means comprises:
   means for supplying an electrical current at a node between the first and second quantum well diodes, the difference between the optical power absorbed by the first quantum well diode and the optical power absorbed by the second quantum well diode being proportional to the electrical current supplied at the node.

4. The invention of claim 3 wherein the supplying means comprises a plurality of photodiodes configured in a predetermined arrangement to evaluate a predetermined spatial derivative of an image, the plurality of photodiodes generating the electrical current in response to light from the image.

5. The invention of claim 3 wherein the supplying means comprises a plurality of photodiodes configured in a predetermined arrangement to perform at least one of optical addition and optical subtraction.

6. The invention of claim 3 wherein the supplying means is an electrical source.

7. The invention of claim 3 wherein the supplying means comprises means responsive to optical signals for generating the electrical current.

8. The invention of claim 7 wherein the means responsive to optical signals comprises first and second photodiodes electrically coupled to each other, the junction between the first and second photodiodes being electrically coupled to the node between the first and second quantum well diodes.

9. The invention of claim 7 wherein the means responsive to optical signals comprises third and fourth quantum well diodes that are electrically coupled, a junction between the third and fourth quantum well diodes being electrically coupled to the node between the first and second quantum well diodes.

10. Semiconductor apparatus for multiplying a signal by a positive or a negative number represented by first and second control beams, the apparatus comprising:
    first and second quantum well diodes coupled electrically in series, each quantum well diode having an optical input for receiving at least one input light beam representing the signal and a different one of the first and second control beams, each quantum well diode absorbing optical energy from a different one of the first and second control beams in an amount proportional to an electrical current flowing through the respective quantum well diode, each quantum well diode having an optical output for outputting at least one output light beam, the output beams representing the product of the signal with the positive or negative number; and
    a current source coupled in series with the first and second quantum well diodes.

11. A method for processing information, the method comprising the step of:
    representing the information as an electrical current of a predetermined magnitude; and
    controlling the absorption characteristics of a pair of electrically-connected quantum well diodes with the electrical current so as to modulate the optical power of a pair of light beams having similar optical power, the difference between the power absorbed from one of the light beams and the power absorbed from the other of the light beams being proportional to the magnitude of the electrical current.

12. The invention of claim 11 wherein the representing step comprises the steps of:
   receiving a plurality of input light beams representing the information; and
   converting the plurality of input light beams into the electrical current.

13. The invention of claim 11 wherein the representing step comprises the steps of:
   receiving first and second input light beams representing the information; and
   converting the first and second input light beams into the electrical current having the predetermined magnitude and a direction of flow, the magnitude of the electrical current being indicative of the value of an analog datum and the direction of flow being indicative of the sign of the analog datum.

14. The invention of claim 13 wherein the sign of the analog datum is positive when the first input light beam has a greater intensity that the second input light beam and the sign of the analog datum is negative when the second input light beam has a greater intensity that the first input light beam.

15. Apparatus comprising:
   first and second quantum well diodes;
   means for connecting the quantum well diodes to a current source in such a way as to cause a current to flow through each of said quantum well diodes; and
   control means for inducing a change in the difference between the levels of the currents in each of the quantum well diodes,
   whereby, when light energy is applied to each of the quantum well diodes, the control means induces a change in the difference between the respective levels of light energy that are absorbed by the quantum well diodes.

16. The invention of claim 15 wherein the control means is such that the amount of the current change is a function of the magnitude of a control signal, whereby the magnitude of the light energy change is a function of the magnitude of the control signal.

17. The invention of claim 16 wherein:
   the connecting means comprises means for connecting the output terminal of one of the quantum well diodes and an input terminal of the other of the quantum well diodes to a node; and
   the control means comprises means for generating a control current and for applying the control current to the node.

18. The invention of claim 17 wherein the control means comprises:
   first and second photodiodes;
   means for connecting the photodiodes to a source in such a way as to cause a current to flow through each of the photodiodes; and
   means for connecting an output terminal of one of the photodiodes and an input terminal of the other of the photodiodes to the node,
   whereby the control current is proportional to changes in the levels of light energy applied to the photodiodes.

* * * * *